United States Patent [19]
Crnjanski

[11] Patent Number: 5,572,924
[45] Date of Patent: Nov. 12, 1996

[54] ROASTING RACK

[76] Inventor: Mihailo Crnjanski, 1616-B Fernside Blvd., Alameda, Calif. 94501

[21] Appl. No.: 605,971

[22] Filed: Feb. 20, 1996

[51] Int. Cl.[6] ............................. A47J 37/04; A47J 43/18
[52] U.S. Cl. ........................... 99/426; 99/449; 99/450; D7/409
[58] Field of Search ........................... 99/339, 351, 340, 99/355, 426, 427, 428, 441, 444–446, 448, 449, 450; 16/262; 126/337 R, 9 R, 9 B; 211/181, 195, 153, 40, 41, 169; 294/1.1, 152, 32, 151, 152, 154; 248/172, 175; D7/409

[56] References Cited

U.S. PATENT DOCUMENTS

| | | | |
|---|---|---|---|
| D. 242,516 | 11/1976 | Burns, Sr. et al. | D7/409 |
| 446,855 | 2/1891 | Earle | 99/426 |
| 2,214,137 | 9/1940 | Irwin et al. | 248/175 X |
| 2,316,620 | 4/1943 | Rees | 99/426 |
| 2,360,026 | 10/1944 | Wall | 126/337 R |
| 2,376,640 | 5/1945 | Wall et al. | 99/450 X |
| 2,703,046 | 3/1955 | Ahlquist | 294/152 X |
| 3,084,617 | 4/1963 | Jamentz | 99/449 X |
| 3,585,922 | 6/1971 | Peterson et al. | 99/355 |
| 3,828,759 | 8/1974 | Cooper | 126/9 R |
| 4,718,402 | 1/1988 | Fordyce | 126/337 R |
| 4,741,262 | 5/1988 | Moncrief | 99/449 |
| 4,848,217 | 7/1989 | Koziol | 99/426 |

*Primary Examiner*—Timothy F. Simone
*Attorney, Agent, or Firm*—Brian Beverly

[57] ABSTRACT

An improved roasting rack having an infinitely adjustable width comprising two interlocking frameworks. A first and a second framework each include a plurality of grate members. Each grate member comprises a base end and an elongated arm extending away from the base end and forming a distal end of each framework. An upper cross-bar is affixed to the distal end of each framework and a lower cross-bar is affixed to the inside surface of the base ends adjacent the elongated arms. The first framework inserts into the second framework, to join the framework and form a roasting rack, such that the elongated arms interleave with each other and so that the upper cross-bar of each framework rides on a continuous top bearing support surface provided by the elongated arms of the other framework. The infinitely adjustable width of the roasting rack is characterized by the position of the upper cross-bar of each framework on the continuous top bearing support surface of the other framework.

20 Claims, 6 Drawing Sheets

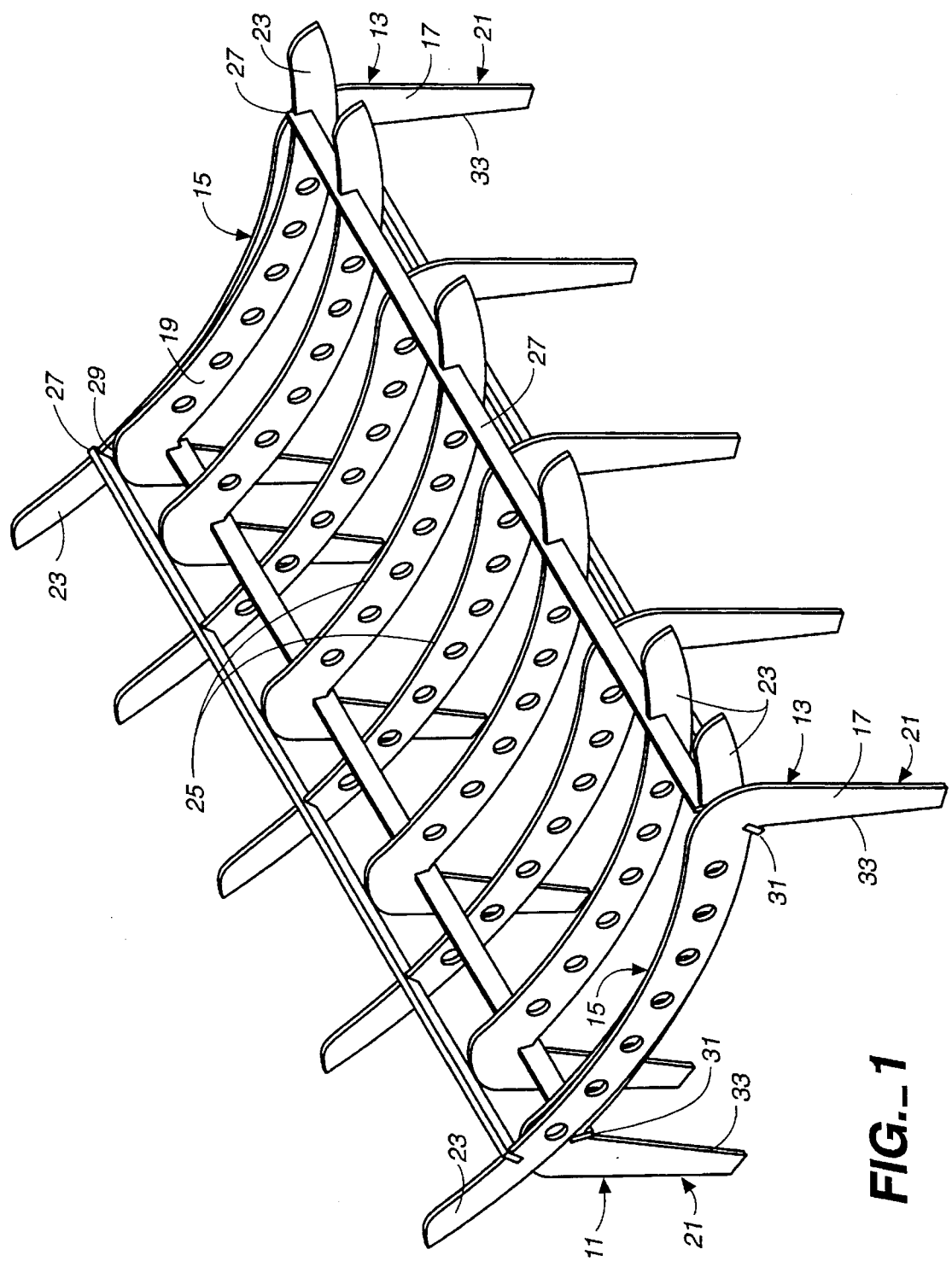
FIG._1

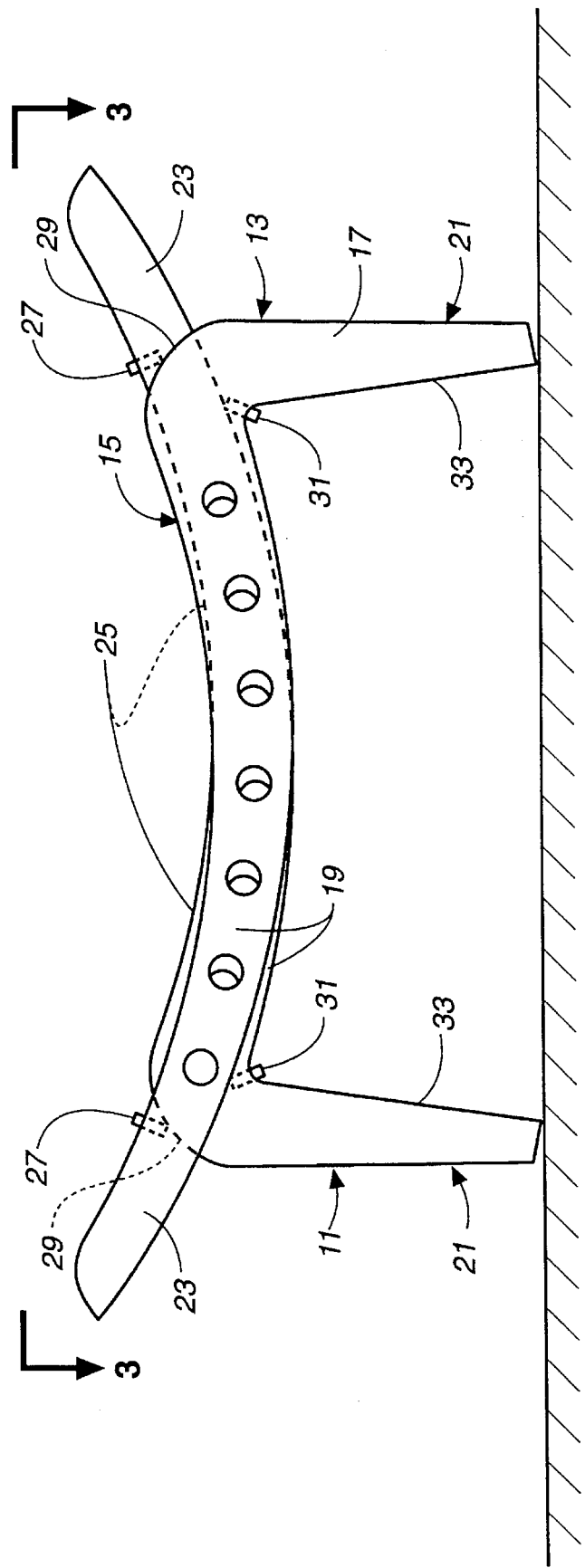
FIG._2

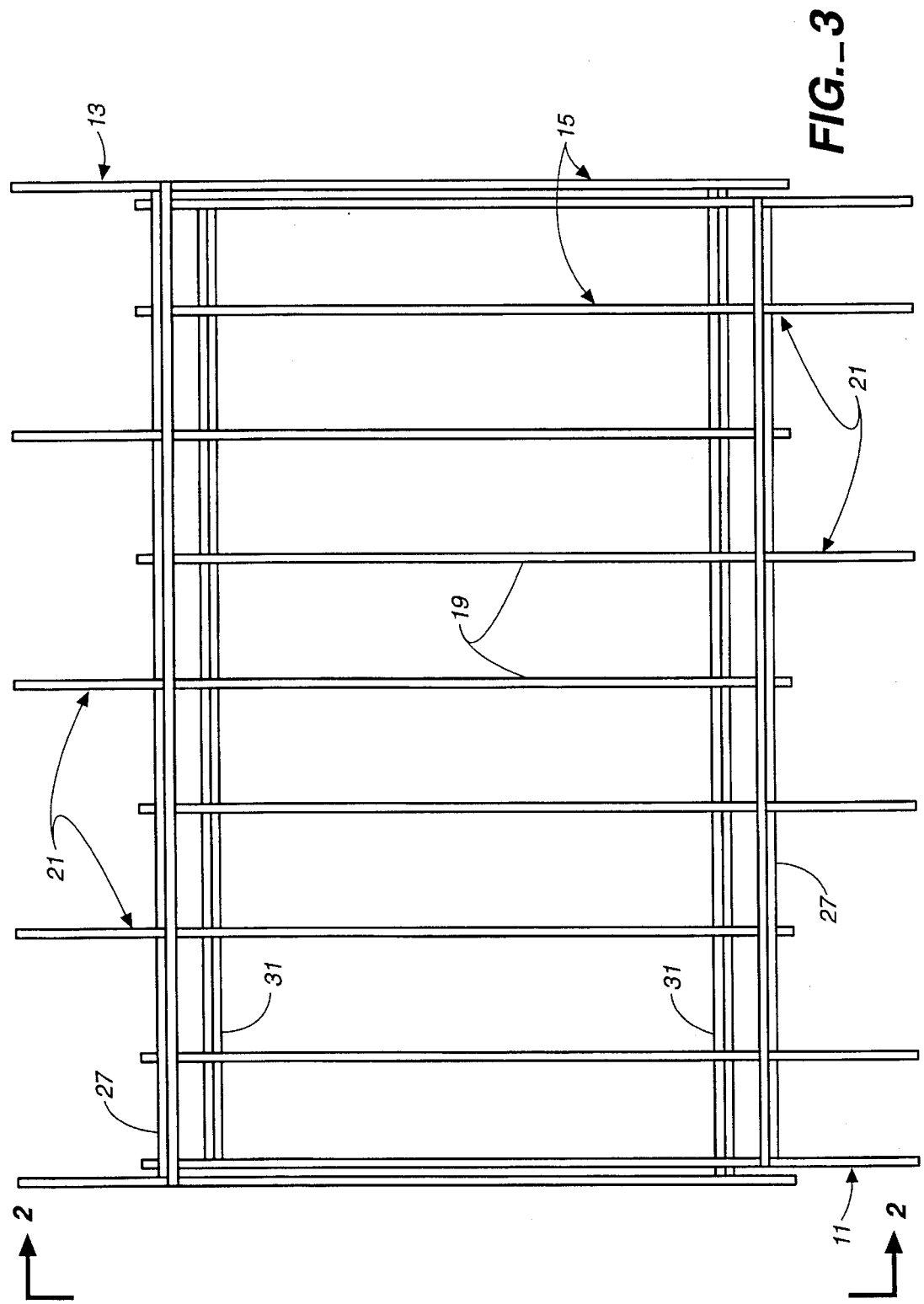
FIG._3

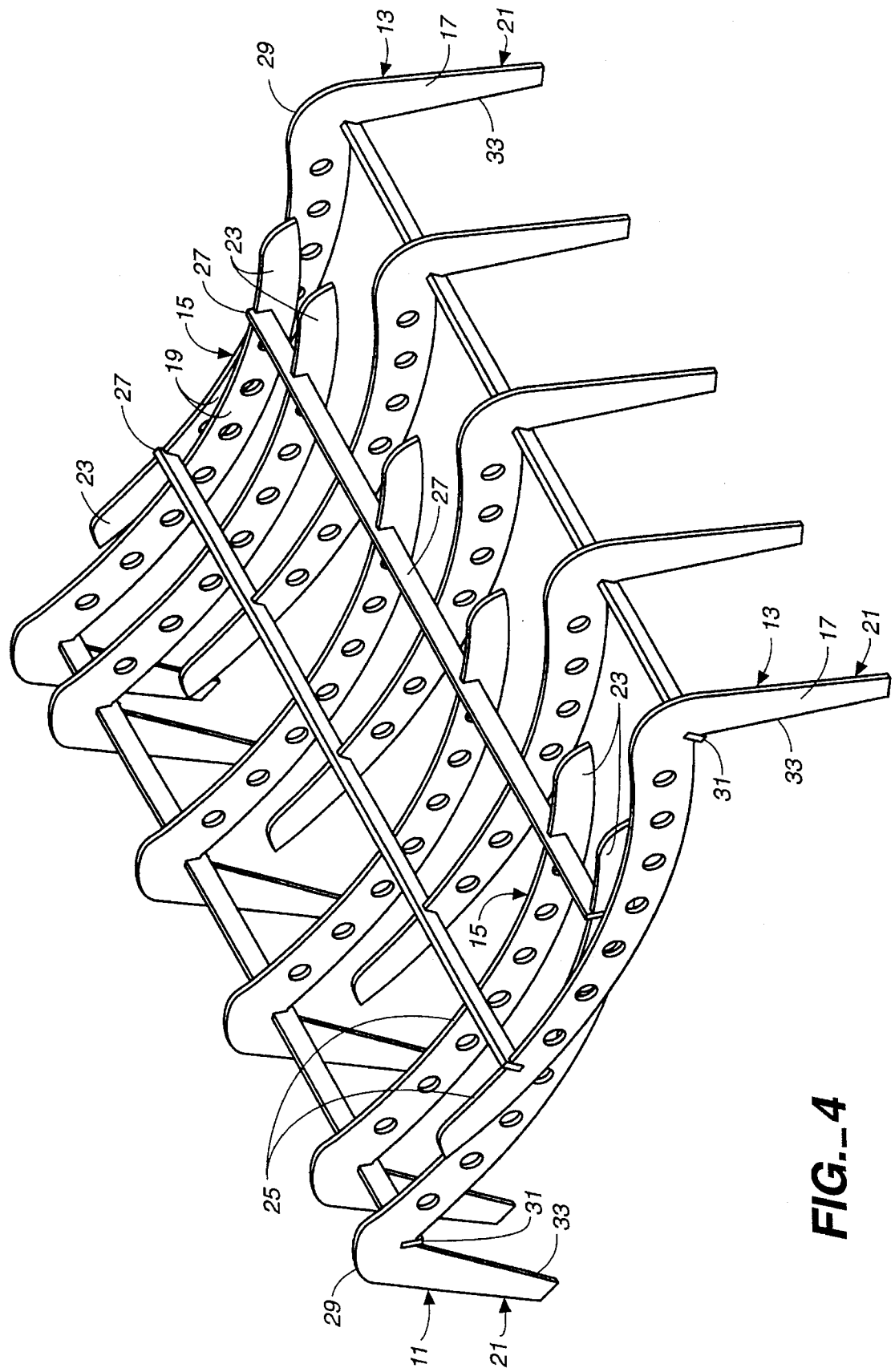
FIG._4

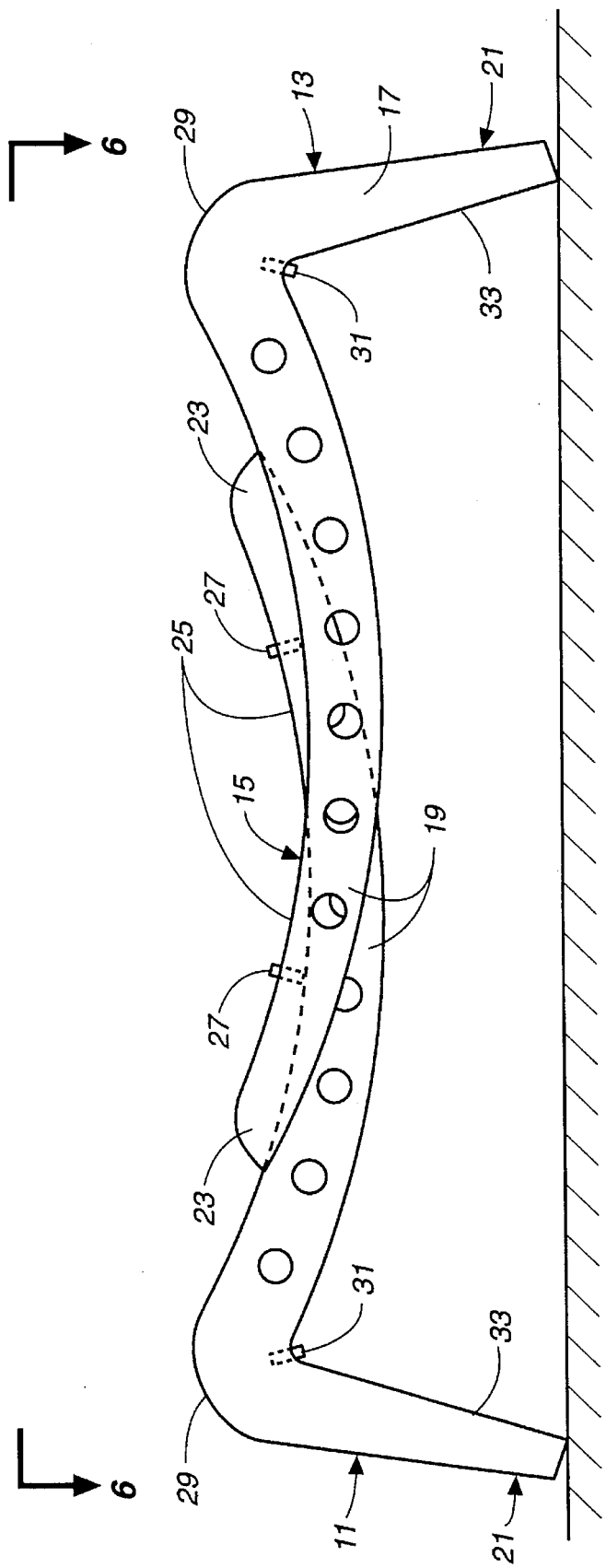
FIG._5

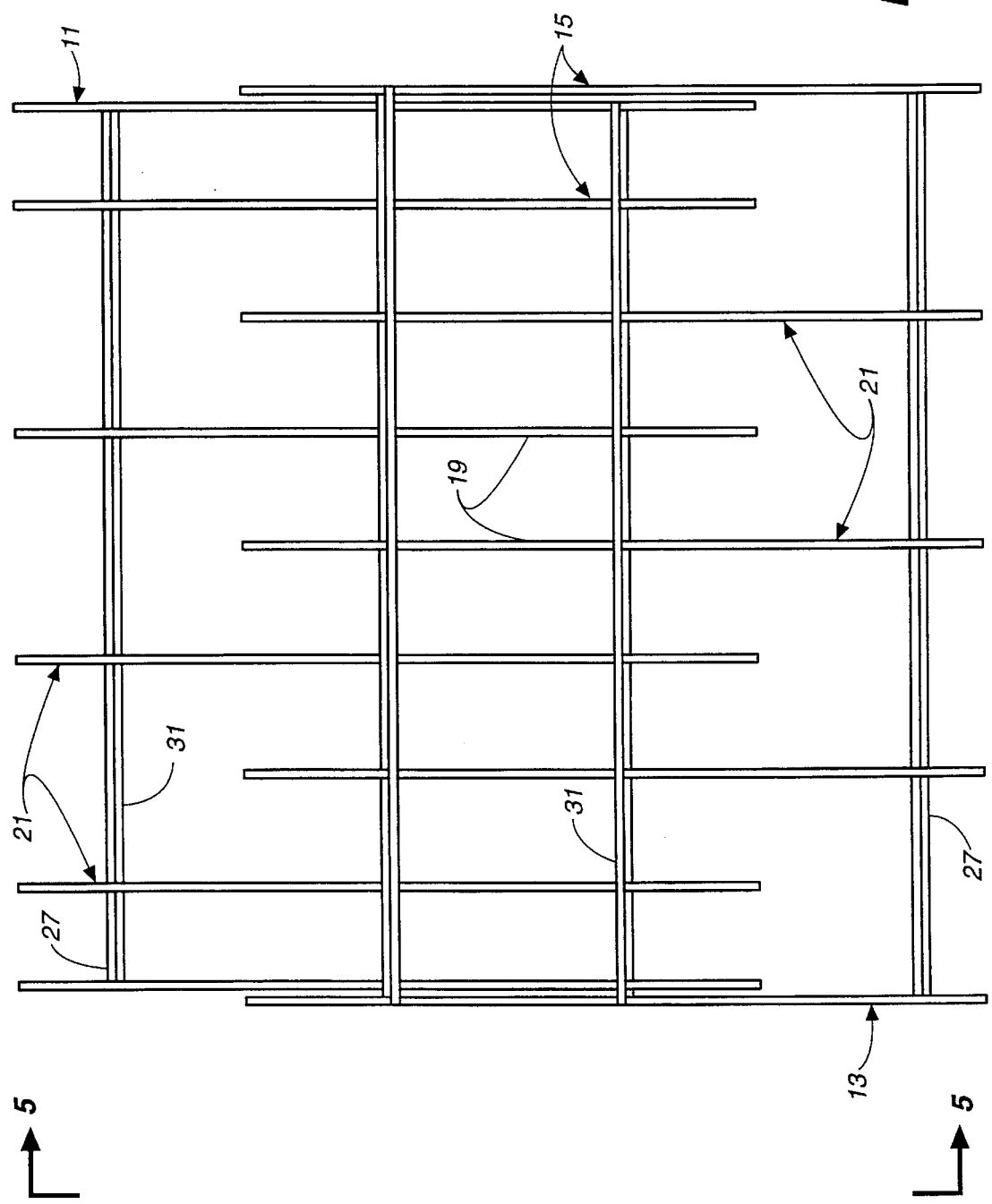
FIG._6

ROASTING RACK

BACKGROUND OF THE INVENTION

The present invention relates to a roasting rack, more particularly one having a raised support surface of infinitely adjustable width for the item to be roasted. The support surface is stable at all widths of adjustment and is concave to facilitate retention of the items placed thereon. This invention is also adapted to allow placement of a significant number of other roasting items underneath the support surface for interaction during the cooking process between the items roasting on top of and below the support surface.

Typically in the art, roasting racks are configured such that the support surface for the item to be roasted, usually a cut of meat or a bird, has only one width or, at most, two or three distinct widths. The limited number configurations have been defined by the mechanisms designed to hold the rack in a stable position. Further, prior art roasting racks typically have provided a flat roasting surface which tended to allow the items being roasted to shift from side to side. This problem was addressed by providing side supports which held the item firmly in place but in a limited number of positions. Finally, no roasting racks enable placement of a significant number of items for roasting immediately beneath the support surface of the rack for interaction with the items roasting on top of the support surface.

The objective of the present invention is to provide a roasting rack with a support surface having the ability to be infinitely varied in width for the items that are to be roasted, yet being a stable surface at all points of adjustment. A further object of the invention is to provide the infinitely variable support surface with a concave curvature which directs the items placed thereon towards the middle of the support surface thereby allowing the items to be maneuvered more easily while at all times guiding the items to retain them on the support surface without interference from side support structures. A third objective of the invention is to raise the support surface sufficiently to provide a space beneath it in which to place further items to be roasted. Still further objects of the invention will become obvious based upon the following specification, claims, and attached drawings.

SUMMARY OF THE INVENTION

A roasting rack according to the invention includes a first framework and a second framework. Each framework is comprised of a plurality of grate or framework members. Each grate member has a base portion and an elongated arm extending away from the base portion. The elongated arms have a continuous top bearing surface on which are placed the items to be roasted. A follower support means, such as a top cross-bar, is affixed to the distal end of the top support surface of each grate member thereby joining the grate members into a framework. Typically, a lower cross-bar is affixed to the base portion of each grate member further joining them into a framework and providing strength to the framework. The grate members of the first framework are insertable into the grate members of the second framework such that the grate members of the first framework interleave with the grate members of the second framework, and such that the follower support means of each framework rides on the top support surface of the other framework. The elongated arms of each framework are thus each and collectively supported by the top support surface of the grate members of the other framework. A roasting rack is thus formed which has an infinitely adjustable width characterized by the position of the follower support means of each framework on the top support surface of the other framework. Typically the top support surfaces of the grate members of the framework are concave and have a downwardly arcuate portion adjacent the base end. The lower cross-bar may be located on the inside surface of the base end of the grate members adjacent the elongated arms such that when the follower support means (e.g., upper cross-bar) of each framework rests on the arcuate portion of the top support surface of the other framework, the bottom surface of the elongated arms of each framework are simultaneously resting on the lower cross-bar of the other framework in a strong and stable configuration of the roasting rack.

DESCRIPTION OF THE DRAWINGS

FIG. 1 is a perspective view of a roasting rack in accordance with the invention.

FIG. 2 is a side view of a roasting rack, in accordance with the invention, showing a roasting rack in the same position as FIG. 1.

FIG. 3 is a top plan view of a roasting rack in accordance with the invention showing a roasting rack in the same configuration as in FIG. 1, seen along lines 3 of FIG. 2.

FIG. 4 is a perspective view of a roasting rack in accordance with the invention showing a roasting rack with the base ends separated farther than shown in FIG. 1.

FIG. 5 is a side view of a roasting rack, in accordance with the invention, showing a roasting rack in the same configuration as in FIG. 4.

FIG. 6 is a top plan view of a roasting rack in accordance with the invention showing a roasting rack in the same configuration as in FIG. 4.

DETAILED DESCRIPTION OF THE ILLUSTRATED EMBODIMENT

A roasting rack is illustrated and described.

The roasting rack comprises two frameworks, a first framework 11 and a second framework 13. The first framework 11 and the second framework 13 are joined together to form a self-supporting roasting rack.

In the preferred embodiment, each framework includes a plurality of grate members 15. Each grate member 15 includes a base end 17 and an elongated arm 19 extending away from the base end 17. The base ends 17 of the grate members 15 collectively form a base end of each framework 21. In other embodiments the base end of each framework 21 could comprise as few as two base ends 17 of the grate members 15, or could be comprised of other base means sufficient to support the elongated arms 19 from a surface, e.g., an inverted T-shaped leg.

The arms 19 of each framework 11 or 13 form an unsupported distal end 23 of the framework. In the preferred embodiment as illustrated, the arms 19 collectively provide a continuous top bearing support surface 25. The invention would still function if as few as one of the elongated arms provided a continuous top bearing support surface. As illustrated the top bearing support surface 25 is concave which facilitates retention of the items to be roasted on it. The invention still would be operable if the top bearing support surface 25 were frat, rather than concave. An upper cross-bar 27 is affixed to the top bearing support surface 25 proximate the distal end 23 of the framework. The upper cross-bar 27 as illustrated is affixed to each of the grate members 15, but could be affixed to fewer than all of the grate members in other embodiments.

The grate members 15 of the first framework 11 are insertable into and interleave with the grate members 15 of the second framework 13. The upper cross-bar 27 of each framework 11 or 13 rests and is adjustably movable on the top bearing support surface 25 of the other framework 13 or 11. Hence, the distal end 23 of each framework 11 or 13 is supported over a work surface by the top bearing support surface 25 of the other framework 13 or 11 and the entire roasting rack stands on the base ends 17 of the grate members 15 of each framework. As can best be seen by comparing FIGS. 1 and 4, the roasting rack can be adjusted to an infinite number of positions by pulling framework 11 and framework 13 apart from each other to vary the position of the upper cross-bar 27 of each framework 11 or 13 on the top bearing support surface 25 of the other framework 13 or 11.

In FIG. 2 it can be seen that the top bearing support surface 25 has an arcuate portion 29 adjacent the base ends 17 of the grate members 15 and a lower cross-bar 31 is affixed to the inside surface 33 of the base ends 17 of the grate members 15 adjacent the elongated arms 19. As shown in FIG. 1 and 2, the frameworks can be adjusted such that the upper cross-bar 27 of each framework rests on the arcuate portion 29 of the top bearing support surface 25 of the other framework and simultaneously the distal end 23 of each framework rests on the lower cross-bar 31 of the other framework. This arrangement of the frameworks as illustrated provides a strong and stable configuration for the roasting rack because the placement of the upper cross-bars 27 on the arcuate portion 29 of the top bearing support surface 25 tends to prevent the frameworks 11 and 13 from separating while the lower cross-bars 29 prevent the distal ends 23 of the frameworks 11 and 13 from dropping.

In further preferred embodiments, the upper cross-bar 27 could be replaced by other follower support means affixed downward of and below the continuous top bearing support surface 25 of each framework 11 or 13 and could comprise rails or other continuous bearing support means affixed to the sides of the arms 19 so long as they continuously supported the distal end 23 of the other framework. In still further preferred embodiments, the follower support means could be affixed to fewer than all of the elongated arms 19.

With a roasting rack provided in accordance with the present invention, articles to be roasted varying substantially in size may be placed on the continuous top bearing support surface 25. Further articles to be roasted may be simultaneously placed beneath the elongated arms 19. It is contemplated that the roasting rack would normally be placed in a roasting pan. Alternatively, the base ends 21 of each framework 11 or 13 could drape over the edges of a roasting pan leaving the elongated arms 19 to traverse the span between opposing edges of the pan. The roasting rack can also be inverted as needed so that the base ends 21 would provide side support, as for an especially large item to be roasted.

There have thus been described certain preferred embodiments of a roasting rack. While preferred embodiments have been described and disclosed, it will be recognized by those with skill in the art that modifications are within the true spirit and scope of the invention. The appended claims are intended to cover all such modifications.

What I claim is:

1. A roasting rack comprising
 a first framework,
 a second framework,
 each of said first and second frameworks having
  a base end for supporting the base end of said framework on a support surface,
  a plurality of elongated grate members extending away from said base end and having flee ends which form an unsupported distal end of said framework,
  follower support means on the unsupported distal end of said framework,
  at least one of the grate members of said framework including a continuous bearing support surface for receiving the follower support means of the other framework,
 the grate members of said first framework being insertable into the grate members of the second framework to join said first and second frameworks such that the grate members of said first framework interleave with the grate members of said second framework, and such that the follower support means of each of said frameworks is supported on and adjustably movable along the bearing support surface of the grate members of the other framework,
 whereby the distal end of each of said frameworks is supported above a support surface by the other framework and a self-supporting rack is formed having an infinitely adjustable width that is characterized by the position of the follower support means of each framework on the bearing support surface of the other framework.

2. The roasting rack of claim 1 wherein each of said grate members has a continuous bearing support surface.

3. The roasting rack of claim 1 wherein at least one of said grate members of each framework has a top support surface forming a continuous bearing support surface for the follower support means of the other framework.

4. The roasting rack of claim 1 wherein each of said grate members has a top support surface and wherein the top support surfaces of said grate members of each said framework collectively form a continuous top bearing support surface for the follower support means of the other framework.

5. The roasting rack of claim 4 wherein said follower support means of each framework is comprised of cross-bar means which extends across and interconnects at least two of the grate members thereof, said cross-bar means being disposed to ride on and follow the continuous top bearing support surface of the other framework when said first and second frameworks are joined.

6. The roasting rack of claim 5 wherein said cross-bar means of each framework extends across and interconnects all the grate members thereof.

7. The roasting rack of claim 6 wherein said cross-bar means of each framework is disposed proximate the distal end of said framework.

8. The roasting rack of claim 6 wherein said cross-bar means comprises a cross-bar.

9. The roasting rack of claim 1 wherein the base end of each said framework comprises a plurality of grate members.

10. A roasting rack comprising
 a first framework,
 a second framework,
 each of said first and second frameworks having
  a base end for supporting the base end of said framework on a support surface,
  a plurality of elongated grate members extending away from said base end and having free ends which form an unsupported distal end of said framework, follower support means on the unsupported distal end of said framework, each of said grate members having a top support surface, said top support surfaces forming a continuous top bearing support surface for the follower support means of the other framework, the grate members of said first framework being insertable into the grate members of the second framework to join said first and second frameworks such that the grate members of said first framework interleave with the grate members of said second framework, and such that the follower support means of each of said frameworks is supported on and adjustably movable along said continuous top bearing support surface of said grate members of the other framework to an infinite number of positions, and whereby the distal end of each of said frameworks is supported above a work surface by the other framework and a self-supporting rack is formed having an infinitely adjustable width that is characterized by the position of the follower support means of each framework on the bearing support surface of the other framework.

11. The roasting rack of claim 10 wherein said top support surfaces are concave.

12. The roasting rack of claim 10 wherein said follower support means of each framework is comprised of cross-bar means which extends across and interconnects the grate members thereof, said cross-bar means being disposed to ride on and follow the continuous top support surface of the other framework when said first and second frameworks are joined.

13. The roasting rack of claim 12 wherein said cross-bar means of each framework is disposed proximate the distal end of said framework.

14. The roasting rack of claim 12 wherein said cross-bar means comprises a cross-bar.

15. The roasting rack of claim 10 wherein said top support surface of each said grate member includes a downwardly arcuate portion adjacent said base end, said base end has an inside surface, said grate members have a lower surface, each said framework includes a lower cross-bar means affixed to said inside surface of said base end proximate said elongated grate members, such that the joined frameworks are movable from a first position, wherein said follower support means of each framework rests on the arcuate portion of said top support surface of said grate members of the other framework and said lower surface of said grate members rests on said lower cross-bar means so that the frameworks are securely but demountably positioned, to an infinite number of other positions.

16. The roasting rack of claim 15 wherein, except for said downwardly arcuate portion of said top support surfaces of said grate members, said top support surfaces are concave.

17. The roasting rack of claim 10 wherein said base end of each said framework comprises a plurality of grate members.

18. The roasting rack of claim 10 wherein said grate members of said frameworks have a lower surface, and said lower surfaces are raised above a support surface.

19. A roasting rack comprising:

a first framework, a second framework, each of said first and second frameworks having a plurality of grate members, each said grate member having a base end and an elongated arm extending away from the base end, said arms of said grate members forming an unsupported distal end of said framework, said base ends forming a base of said framework for supporting the grate members of said framework on a support surface, upper cross-bar means disposed proximate the unsupported distal end of and extending across and interconnecting the grate members of said framework, said grate members including a continuous, concave top bearing support surface for receiving the cross-bar means of the other framework, and said top bearing support surface further including a downwardly arcuate portion adjacent the base end, said base of each framework having an inside surface, each said framework including a lower cross-bar means affixed to said inside surface of said base proximate said elongated arms, said grate members having a lower surface, the grate members of said first framework being insertable into the grate members of the second framework to join said first and second frameworks such that the grate members of said first framework interleave with the grate members of said second framework, and such that the upper cross-bar means of each of said frameworks is supported on and adjustably movable along said continuous top bearing support surface of said grate members of the other framework, from a first position, wherein said upper cross-bar means of each framework rests on the arcuate portion of said top support surface of said grate members of the other framework and said lower surface of each said grate members rests on said lower cross-bar means of the other framework so that the frameworks are securely but demountably positioned, to an infinite number of other positions, and whereby the distal end of each of said frameworks is supported above a work surface by the other framework and a self-supporting rack is formed having an infinitely adjustable width that is characterized by the position of the upper cross-bar means of each framework on the top bearing support surface of the grate members of the other framework, and the lower surfaces of said grate members are raised above a support surface.

20. The roasting rack of claim 19 wherein said upper cross-bar means comprises an upper cross-bar.

\* \* \* \* \*

UNITED STATES PATENT AND TRADEMARK OFFICE
CERTIFICATE OF CORRECTION

PATENT NO. : 5,572,924
DATED : November 12, 1996
INVENTOR(S) : Mihailo Crnjanski It is certified that error appears in the above—identified patent and that said Letters Patent is hereby corrected as shown below:

Column 2, line 64, "frat," should read -- flat,--.

Column 4, line 5, "flee" should read -- free --.

Signed and Sealed this

Fourth Day of February, 1997

Attest:

BRUCE LEHMAN

Attesting Officer

Commissioner of Patents and Trademarks